United States Patent
Li

(10) Patent No.: US 8,842,369 B2
(45) Date of Patent: Sep. 23, 2014

(54) METHOD AND APPARATUS FOR COMBINING LIGHT SOURCES

(71) Applicant: Jin Li, Big Flats, NY (US)

(72) Inventor: Jin Li, Big Flats, NY (US)

(73) Assignee: Corning Incorporated, Corning, NY (US)

(*) Notice: Subject to any disclaimer, the term of this patent is extended or adjusted under 35 U.S.C. 154(b) by 171 days.

(21) Appl. No.: 13/680,642

(22) Filed: Nov. 19, 2012

(65) Prior Publication Data

US 2014/0139929 A1     May 22, 2014

(51) Int. Cl.
  *G02B 27/14*      (2006.01)
  *G02B 27/09*      (2006.01)

(52) U.S. Cl.
  CPC ................ *G02B 27/141* (2013.01); *G02B 27/0922* (2013.01)
  USPC ...................................... 359/634

(58) Field of Classification Search
  USPC ...................................... 359/634
  See application file for complete search history.

(56) References Cited

U.S. PATENT DOCUMENTS

| | | | |
|---|---|---|---|
| 5,583,683 A | 12/1996 | Scobey | |
| 5,745,153 A | 4/1998 | Kessler et al. | |
| 5,786,915 A | 7/1998 | Scobey | |
| 5,825,551 A | 10/1998 | Clarkson et al. | |
| 6,167,171 A | 12/2000 | Grasis et al. | |
| 6,198,857 B1 | 3/2001 | Grasis et al. | |
| 6,819,402 B2 | 11/2004 | Augustyn et al. | |
| 7,065,105 B2 | 6/2006 | Ehlers et al. | |
| 7,218,451 B2 | 5/2007 | Lee et al. | |
| 7,520,641 B2 | 4/2009 | Minano et al. | |
| 7,537,395 B2 | 5/2009 | Savage-Leuchs | |
| 7,762,465 B2 | 7/2010 | Knowles et al. | |
| 7,764,723 B2 | 7/2010 | Ovtchinnikov et al. | |
| 7,822,304 B2 | 10/2010 | Hirata | |
| 7,830,608 B2 | 11/2010 | Hu et al. | |
| 2005/0088654 A1 | 4/2005 | Hu et al. | |

(Continued)

FOREIGN PATENT DOCUMENTS

| | | |
|---|---|---|
| EP | 0731932 B1 | 5/1999 |
| WO | 0137024 A2 | 5/2001 |

OTHER PUBLICATIONS

Zhan, Shenlong, "Eliminating Dead Spaces of the Laser Diode stack in the Fast-Axis Direction Using a Plane-Parallel Plate Array," Optical Engineering, Sep. 2007, vol. 46, pp. 094203-1-094203-5.

Clarkson, W.A., "Novel Beam Shaping Techniqiue for High Power Diode Bars," Optoelectronics Research Centre, University of Southhamptom Research Paper.

Clarkson, W.A., "Two-Mirror Beam-Shaping Technique for High-Power Diode Bars," Optics Letters, vol. 21, No. 6, Mar. 15, 1996, pp. 375-377.

(Continued)

*Primary Examiner* — James Jones
(74) *Attorney, Agent, or Firm* — Robert L Carlson

(57) ABSTRACT

An apparatus for combining light from multiple laser sources has a first laser array to emit beams of a first wavelength in parallel and in a first plane and a second laser array to emit beams of a second wavelength in parallel with emitted beams in the first laser array. A beam combiner on a transparent body has a rear surface and an incident surface at an oblique angle to the first plane. Intersection of the incident surface with the first plane is oblique to the emitted beams. The beam combiner has a first coating on the incident surface that intersects the first plane and transmits the first wavelength. A rear reflective coating reflects first and second wavelengths. A second coating on the incident surface is coplanar with the first coating and transmits the second wavelength and reflects the first wavelength. A third coating reflects first and second wavelengths.

16 Claims, 18 Drawing Sheets

(56) References Cited

U.S. PATENT DOCUMENTS

2006/0152811 A1* 7/2006 Zheng et al. .................. 359/619
2006/0182155 A1 8/2006 Windpassinger et al.
2007/0268946 A1 11/2007 Schulte et al.

OTHER PUBLICATIONS

Knitsch, Alexander, "Diode Laser Modules of Highest Brilliance for Materials Processing," Proceedings of SPIE, vol. 4651 (202) pp. 256-263.

* cited by examiner

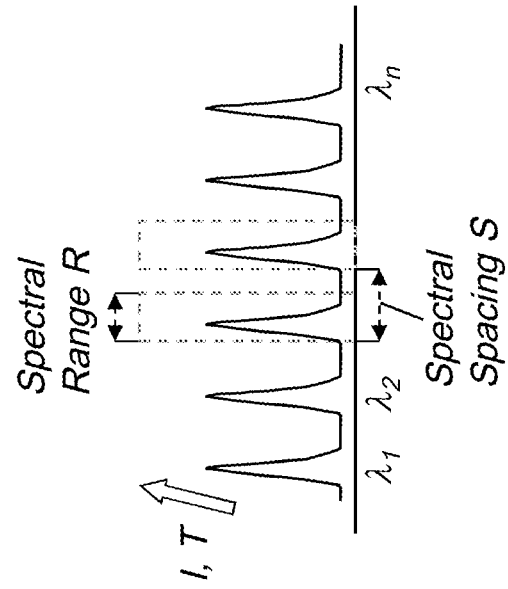
FIG. 2B *(Prior Art)*
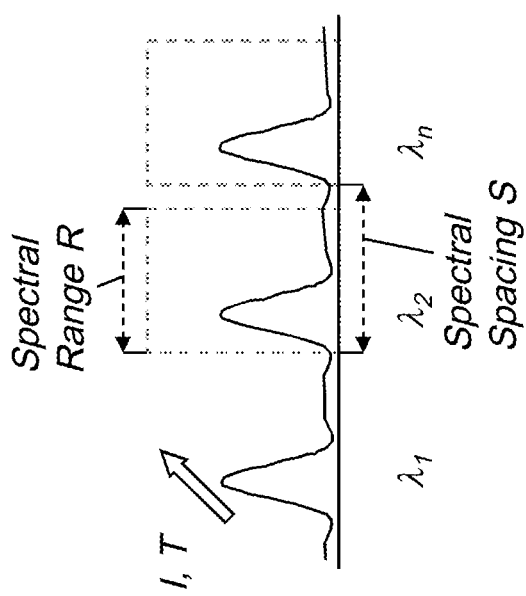
FIG. 2A *(Prior Art)*

METHOD AND APPARATUS FOR COMBINING LIGHT SOURCES

FIELD

The present disclosure generally relates to optical apparatus for combining light from multiple laser sources and more particularly relates to apparatus and methods for spatial and wavelength combination of laser light sources for improved brightness.

BACKGROUND

High-energy laser power has value for numerous uses, including industrial applications for material processing and a number of defense applications. Lasers capable of providing energy in the kilowatt (kW) range include $CO_2$ lasers, direct diode lasers, diode-pumped solid-state laser devices such as bulk solid-state lasers, fiber lasers, and disk lasers.

The direct diode laser offers a number of advantages, including relatively high efficiency. However, when using conventional spatial combination techniques, the spatial brightness available from this laser type is constrained, making direct-diode lasers less suitable for high-energy applications such as metal-cutting, for example.

A number of approaches have been employed for combining laser beams from multiple laser elements in order to achieve higher brightness and power output. One approach uses coherent beam combining (CBC) which requires coherence of the individual beams. CBC methods are workable, but constrained due to the need to have phase tightly controlled among multiple laser elements. Another approach combines two laser sources having different polarization states; however, this method is generally limited to two sources. Yet another approach uses wavelength beam combining (WBC). WBC allows the combination of light from laser elements at different wavelengths, using some types of optical systems.

Recent improvements in the use of on-chip gratings or monolithic integrated gratings have helped to provide improved wavelength stability that is useful for high brightness direct-diode lasers. With these devices, the laser wavelength is stabilized without the requirement for optical feedback using an external grating. This type of development helps to make wavelength beam combining applications more promising for scaling the output laser power derived from such lasers.

The simplified schematic diagrams of FIGS. 1A through 1E show methods for wavelength-beam combining that can be used with lasers at different wavelengths in general, including those with or without on-chip gratings. FIG. 1A shows combination of three or more laser sources LS1, LS2, and LSn using dichroic optics. A first dichroic beamsplitter 10 transmits light at wavelength $\lambda 1$ from laser LS1 and reflects light of wavelength $\lambda 2$ from laser LS2 onto an optical axis OA. A second beamsplitter 12 transmits light of wavelengths $\lambda 1$ and $\lambda 2$ and reflects light of wavelength $\lambda n$ from laser LSn to form a combined output beam 18. As shown in FIG. 1A, one or more additional lasers can be added to the serial arrangement of lasers LS1, LS2, . . . LSn in order to add additional wavelengths to form combined output beam 18.

FIG. 1B shows wavelength beam combining using a lens 14 and a grating 16 in a transmissive embodiment for forming output beam 18. FIG. 1C shows conventional wavelength beam combining using lens 14, with grating 16 in a reflective embodiment.

FIGS. 1D and 1E show wavelength beam combining using free-space optics to direct the combined output beam 18 into an optical fiber 20 or other type of light guide. FIG. 1D uses one or more lenses 14 to combine the laser beams. FIG. 1E uses a parabolic reflector or multiple curved reflective surfaces 22 to form output beam 18.

The conventional approaches shown in simplified form in FIGS. 1A-1E can be used to combine light from multiple laser elements, but, in practice, suffer from a number of shortcomings. Solutions using individual dichroic filters, for example, may result in a bulky optical system. Solutions using refractive or transmissive optics can focus the light from multiple sources, but have high etendue that increases with the number of sources. These solutions are not ideally suited for combining light from multiple sources and directing this light through an optical fiber, for example. Solutions that use gratings require proper spacing and alignment and tend to become too bulky to handle more than a modest number of laser elements.

The beam emitted from a laser element such as a semiconductor diode laser has a highly asymmetric width-to-height (width:height) aspect ratio. In addition, the set of beams emitted from an array of diode lasers are in parallel, so that the output light can be difficult to couple efficiently to an optical system in order to achieve desired levels of optical energy. Thus, it can be seen that there is need for a wavelength beam combining solution that provides a compact and efficient way to combine multiple beams of multiple wavelengths for scaling brightness and power.

SUMMARY

The present disclosure provides an apparatus for combining laser light from multiple laser sources. The apparatus may comprise, a first laser array that includes a first plurality of laser sources, wherein each laser source in the first laser array is energizable to emit a beam of a first wavelength $\lambda 1$ and wherein emitted beams for the laser sources in the first laser array are in parallel and lie in a first plane P1. The apparatus may also comprise, a second laser array that includes a second plurality of laser sources, wherein each laser source in the second laser array is energizable to emit a beam of a second wavelength $\lambda 2$ and wherein emitted beams for the laser sources in the second laser array lie in a second plane P2 and are in parallel with emitted beams for the laser sources in the first laser array. The apparatus may also comprise, a beam combiner that is formed on a transparent body, wherein the beam combiner has a rear surface and has an incident light surface that is disposed in the path of the emitted beams from the first and second laser arrays and wherein the incident light surface is at an oblique angle with respect to the first plane P1 and wherein a line of intersection of the incident light surface with the first plane P1 is oblique to the emitted beams of the first wavelength $\lambda 1$, and wherein the beam combiner has:

(i) a first coating on the incident light surface that intersects the first plane P1, wherein the first coating is transmissive to the first wavelength $\lambda 1$;

(ii) a rear reflective coating that is reflective to the first and second wavelengths $\lambda 1$ and $\lambda 2$, formed on a portion of the rear surface;

(iii) a second coating on the incident light surface that intersects the second plane P2 and that is coplanar with the first coating, wherein the second coating is transmissive to second wavelength $\lambda 2$ and reflective to the first wavelength $\lambda 1$; and (iv) a third coating on the incident light surface that is reflective to first and second wavelengths λ1 and λ2.

One feature of an embodiments disclosed herein is the use of multiple thin film coatings adjacently deposited along a single input surface for combining incident light of multiple wavelengths.

One advantage of the embodiments disclosed herein is the capability to combine light from a number of laser array sources, stacking the light at the same wavelength for reduced etendue and overlaying light of different wavelengths to scale the power and brightness.

Another advantage of the embodiments disclosed herein is its capability for scaling to handle a variable number of wavelengths.

Other desirable objectives, features, and advantages of the embodiments disclosed herein may occur or become apparent to those skilled in the art.

BRIEF DESCRIPTION OF THE DRAWINGS

FIG. 2A is a graph that shows spectral output for conventional Fabry-Perot semiconductor lasers.

FIG. 2B is a graph that shows spectral output for wavelength-stabilized semiconductor lasers, for example, with on-chip gratings.

DETAILED DESCRIPTION

Figure 1A:
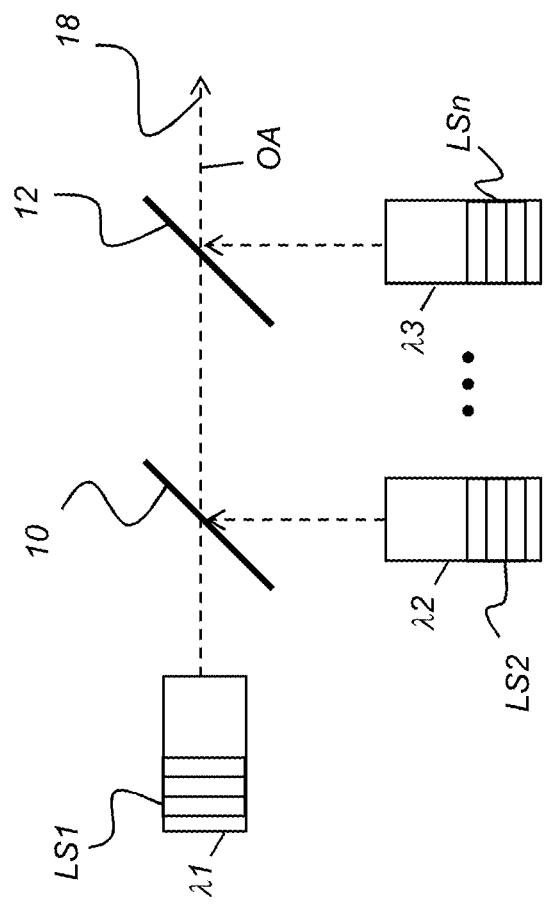
FIG. 1A is a schematic diagram showing wavelength beam combining using discrete dichroic optics.
Figure 1B:
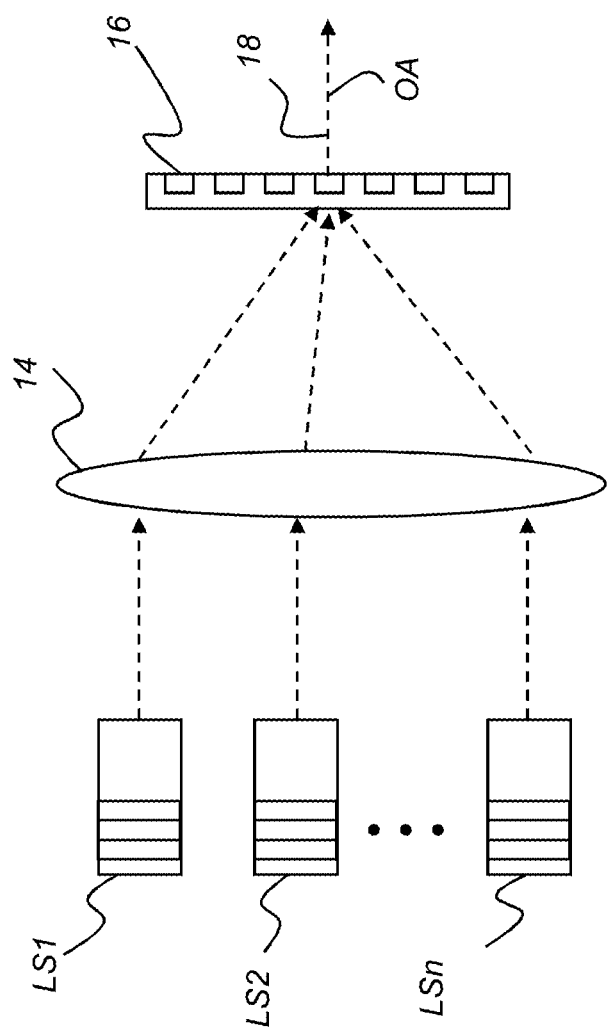
FIG. 1B is a schematic diagram showing wavelength beam combining using a lens and a grating.
Figure 1C:
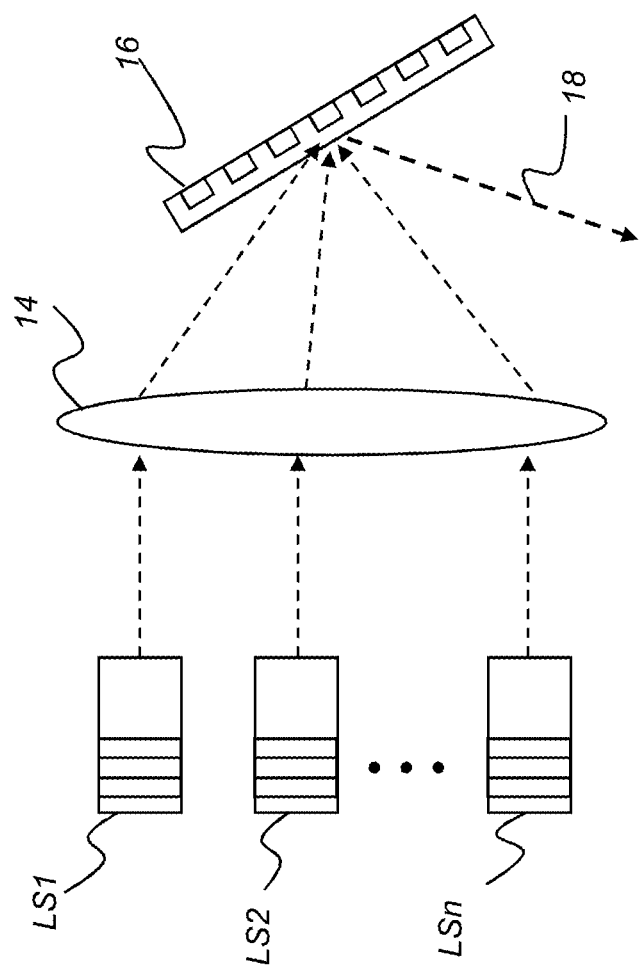
FIG. 1C is a schematic diagram showing wavelength beam combining using a lens and a grating in a reflective embodiment.
Figure 1D:
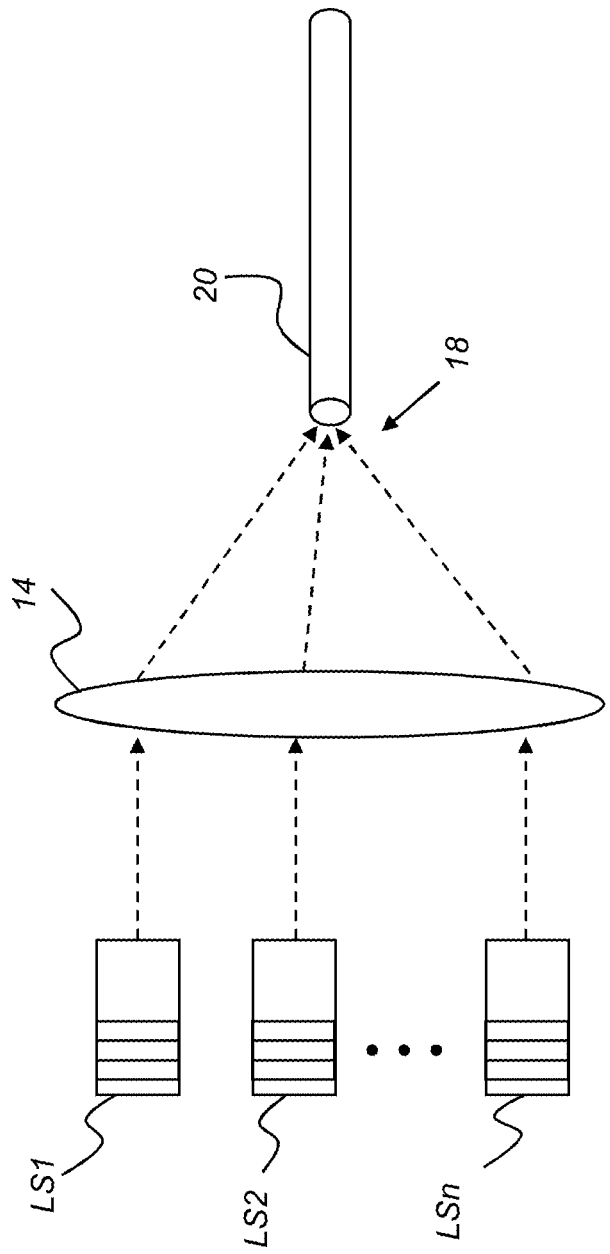
FIG. 1D is a schematic diagram showing wavelength beam combining using free-space refractive optics to direct the combined beam to an optical waveguide.
Figure 1E:
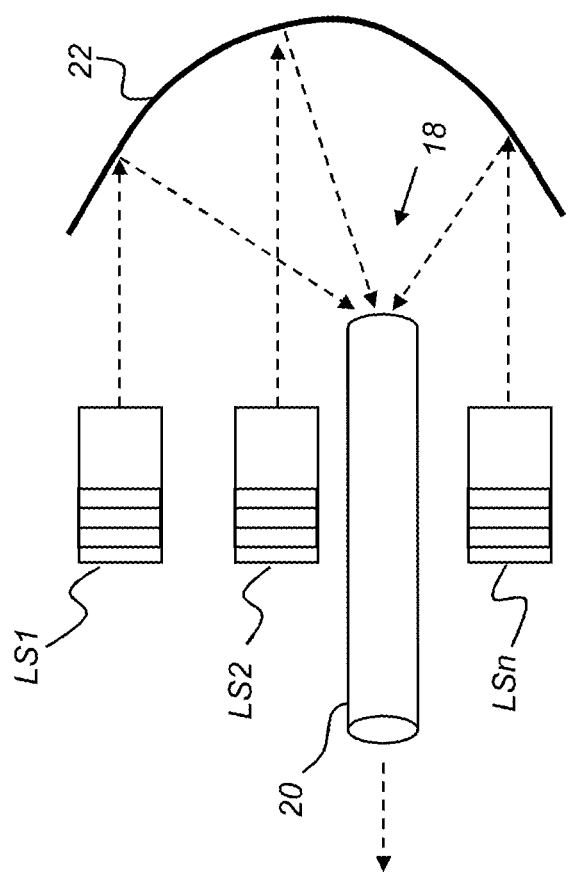
FIG. 1E is a schematic diagram showing wavelength beam combining using free-space reflective optics to direct the combined beam to an optical waveguide.

Figures shown and described herein are provided in order to illustrate key principles of operation and fabrication for an optical apparatus according to various embodiments and a number of these figures are not drawn with intent to show actual size or scale. Some exaggeration may be necessary in order to emphasize basic structural relationships or to show features of interest or principles of operation. For improved visibility, for example, some coplanar structures such as coatings that would be aligned in practice may be deliberately shown slightly offset from each other in views where these structures overlap. Similarly, beam shape and spacing may be exaggerated or compressed as represented in figures herein, in order to show dimensions and operation more clearly.

In the context of the present disclosure, terms "top" and "bottom" or "above" and "below" are relative and do not indicate any necessary orientation of a component or surface, but are used simply to refer to and distinguish opposite surfaces or different views of light paths within a component or block of material. Similarly, terms "horizontal" and "vertical" may be used relative to the figures in the following description, to describe the relative orthogonal relationship of components or light beams that align in different planes, for example, but do not indicate any required orientation of components with respect to gravity or to true horizontal and vertical orientation.

Where they are used, the terms "first", "second", and so on, do not necessarily denote any ordinal or priority relation, but are used for more clearly distinguishing one element or time interval from another. There are no fixed "first" or "second" elements in what is taught herein; these descriptors may be merely used to clearly distinguish one element from another similar element in the context of the present disclosure. Similarly, numbered designations are assigned to identify different components or features in the figures and in the description that follows, and help to identify function and operation more clearly.

In the context of the present disclosure, a surface considered to "reflect" or to be reflective at a certain wavelength reflects at least about 95% of incident light of that wavelength. A surface considered to "transmit" or to be transmissive at a certain wavelength transmits at least about 80% of incident light of that wavelength. Relative to optical filters, the terms "short wave pass", "short wavelength pass", and "SWP" are considered to be equivalent; similarly, terms "long wave pass", "long wavelength pass", and "LWP" are considered to be equivalent.

In the context of the present disclosure, the phrase "oblique angle" is used to mean a non-normal angle that is slanted so that it differs from normal, that is, differs from 90 degrees or from an integer multiple of 90 degrees, to within tolerances acceptable for optical design, such as differing by more than 1.5 or 2 degrees depending on the function of the system, for example, along at least one axis. An oblique angle may thus be less than 90 degrees using this general definition. Two structures or features are "substantially parallel" or "substantially in parallel" when they are parallel to within tolerances acceptable for optical design, such as to within 1 or 2 degrees or less, for example. Similarly, two structures or features are "substantially orthogonal" when they are orthogonal to within tolerances acceptable for optical design, such as to within 1.5 degrees or less.

In the context of the present disclosure, the phrase "laser array" denotes any suitable type of laser array, including, for example, a laser diode array or other type of laser array.

In the context of the present disclosure, the term "energizable" relates to a device or set of components that perform an indicated function upon receiving power and, optionally, upon receiving an enabling signal. A laser, for example, is energizable to emit light.

Each laser beam is centered about its axis of propagation. Two or more laser light beams are considered to lie in the same plane if their respective center axes lie substantially in the same plane, to within tolerances acceptable for optical design. Two or more laser light beams are considered to be in parallel if their respective central axes are at least substantially in parallel.

In drawings and description that follow, a number of components that might be needed or used in practice are not shown. Optical mounts, for example, are not shown or described; those skilled in the optical arts will readily recognize how conventional methods can be used for mounting and spacing optical components for the arrangements shown. In addition, control components for energizing laser diodes are omitted, along with connectors, wiring, power sources, and other features needed to generate laser light and familiar to those skilled in the laser energization and control art.

Embodiments disclosed herein address the need for providing high brightness laser power by combining laser beams from laser arrays of two or more wavelengths. Each laser array emits light centered at a particular wavelength; however, in practice, some tolerance must be allowed about the nominal or center wavelength. In order to avoid unwanted interference effects that can compromise or even cancel any power gain, wavelengths are considered with respect to spectral range and spectral spacing.

The graph of FIG. 2A shows exemplary spectral output for conventional Fabry-Perot (F-P) semiconductor lasers of three different wavelengths $\lambda 1$, $\lambda 2$, and $\lambda n$, without added stabilization from gratings. Intensity (I) for transmission (T) is represented with respect to the ordinate (vertical) axis, wavelength along the abscissa (horizontal axis). The typical spectral range R of the laser extends to encompass a span of wavelengths that can be more than 10 nm over operating current and temperature for a 10 W F-P semiconductor laser diode. For considerations of combining light energy from laser elements of multiple wavelengths, the spectral range R is a factor in determining a spectral spacing S to provide between laser elements. The spectral spacing provides a minimum allowance between wavelengths for diode laser arrays that can be combined without the risk of loss due to unwanted interference effects.

By comparison, and substantially scaled to the graph of FIG. 2A, the graph of FIG. 2B shows spectral output for semiconductor lasers that have on-chip gratings. Significantly, the spectral range R for any nominal wavelength is narrower than for the conventional laser diodes of FIG. 2A and can be 2 nm or less. The spectral spacing S needed between nominal wavelengths for the laser arrays can be reduced accordingly. This allows the combination of laser light from laser arrays that have "nearby" center wavelengths, significantly increasing the number of wavelengths that can be combined within a fixed range of wavelengths.

Figure 3A:
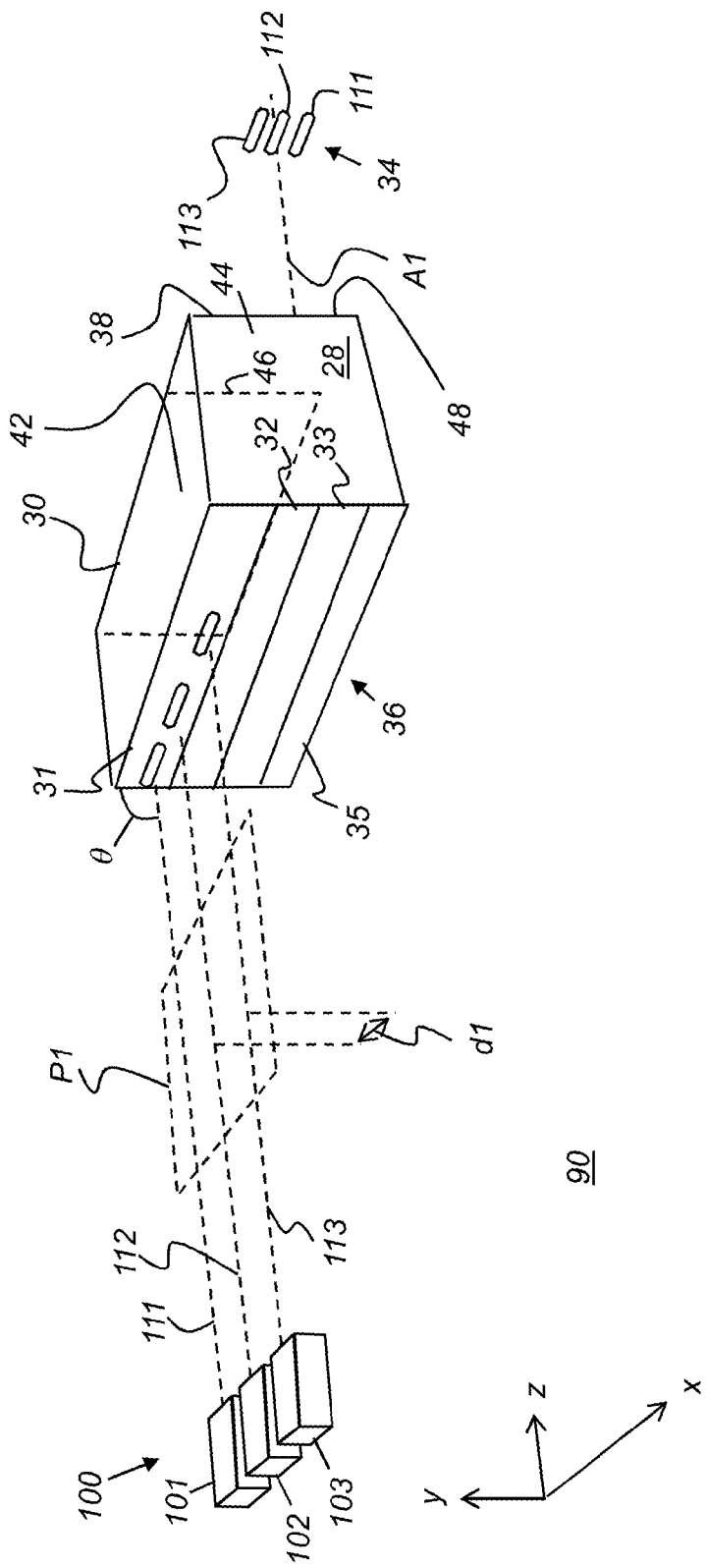
FIGS. 3A-3C are perspective views that show various features of a beam combiner and how the beam combiner relates spatially to laser arrays in a combiner apparatus.
Figure 3B:
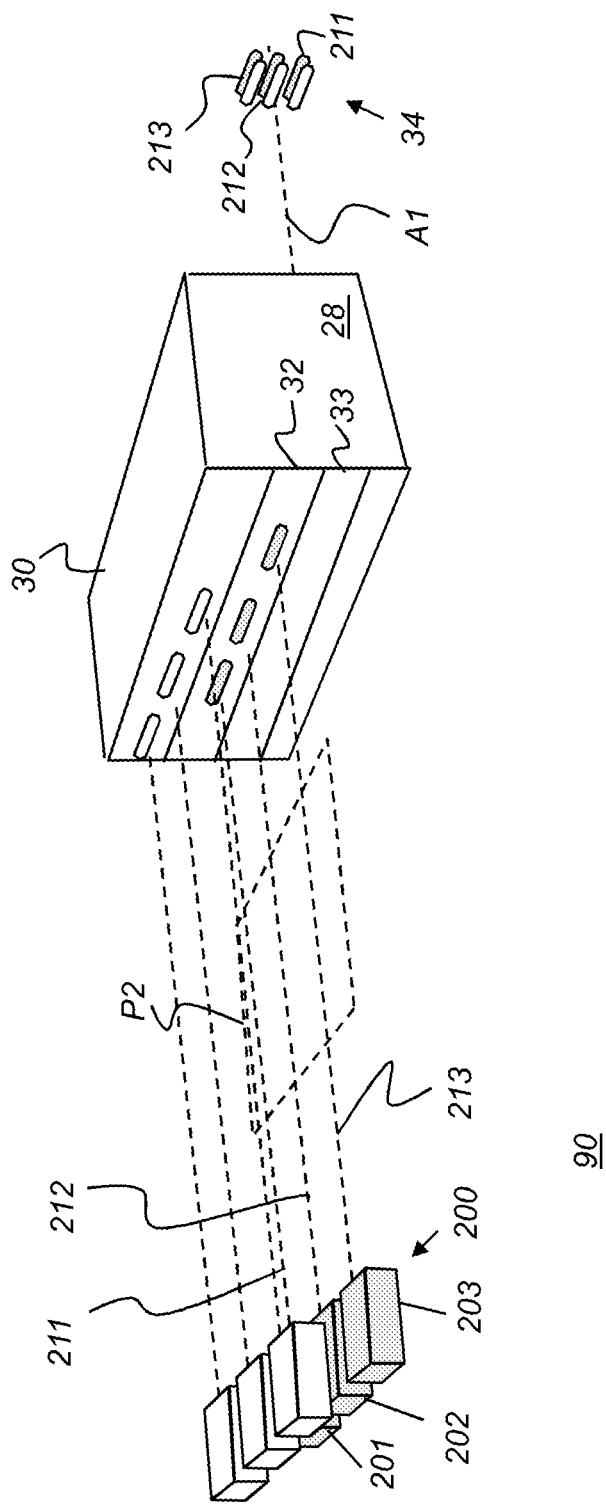
Figure 3C:
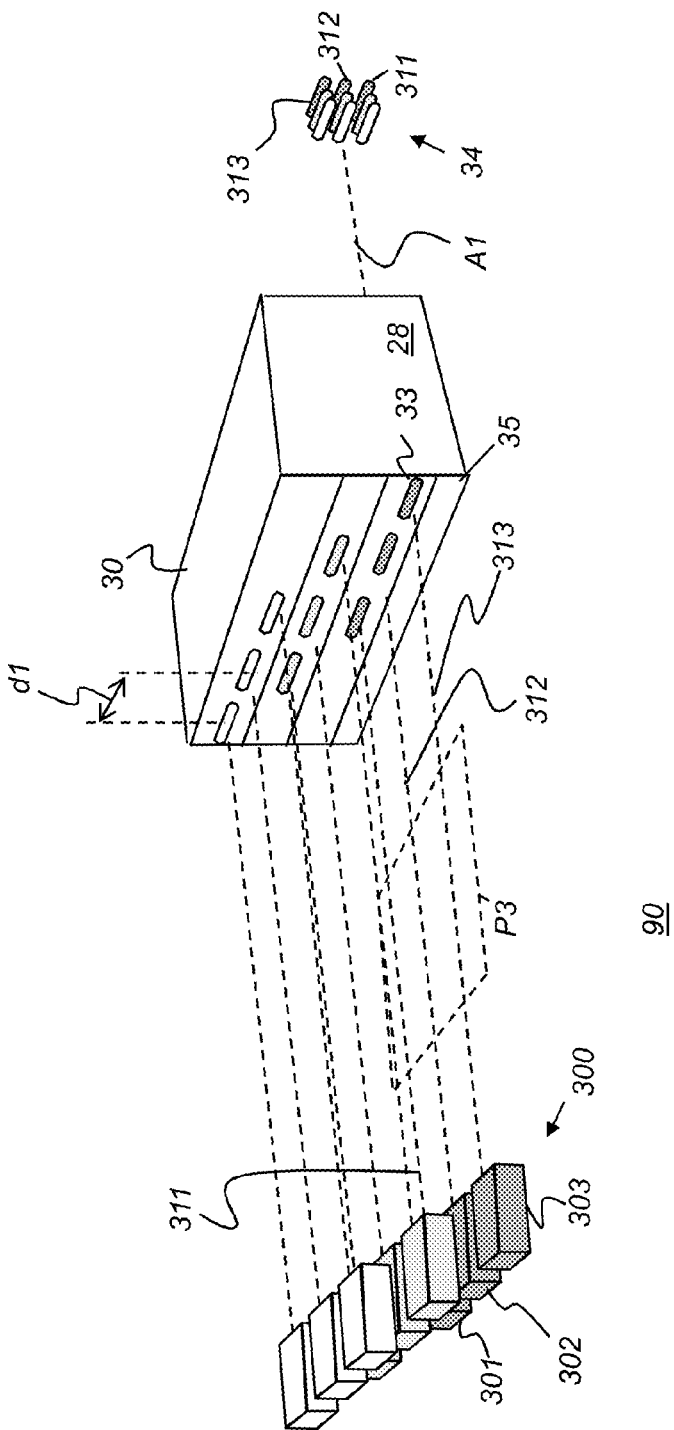

The perspective views of FIGS. 3A, 3B, and 3C show various features of a beam combiner 30; this sequence of figures shows, in progressive fashion, how beam combiner 30 relates spatially to laser arrays 100, 200, and 300 in a combiner apparatus 90. Beam combiner 30 is formed on a transparent block of material 28. By way of illustration and not limitation, each laser array is shown with three laser sources: laser array 100 has laser sources 101, 102, and 103; laser array 200 has laser sources 201, 202, and 203; laser array 300 has laser sources 301, 302, and 303. It can be appreciated that each laser array can have 2, 3, 4, or more laser sources, such as laser diodes. In a symmetric arrangement, each laser array has the same number of laser sources. The term "laser source" is used to encompass a laser of a suitable type along with any corresponding lenses or other conditioning optical components that shape and direct the beam emitted from the laser. For the sake of clarity, optical components that would be considered as part of the laser source are not shown in these figures.

As shown in FIG. 3A, each laser source 101, 102, and 103 is energizable to emit a corresponding beam 111, 112, and 113 respectively, of first wavelength $\lambda 1$. The emitted beams 111, 112, and 113 are in parallel and lie in a first plane P1, a portion of which is represented in dashed outline. Similarly, as added in FIG. 3B, laser sources 201, 202, and 203 emit corresponding beams 211, 212, and 213, respectively, of a second wavelength $\lambda 2$. Emitted beams 211, 212, and 213 are parallel to emitted beams 111, 112, and 113 and lie in a second plane P2. As added in FIG. 3C, laser sources 301, 302, and 303 emit corresponding beams 311, 312, and 313, respectively, of a third wavelength $\lambda 3$. Emitted beams 311, 312, and 313 are parallel to emitted beams 111, 112, and 113 as well as to beams 211, 212, and 213 and lie in a third plane P3. Planes P1, P2, and P3 are mutually parallel.

Still referring to FIGS. 3A-3C, beam combiner 30 has an incident light surface 36 and a rear surface 38. Incident light surface 36 has a first coating 31 that intersects first plane P1 and is transmissive to wavelength $\lambda 1$ and reflective of other wavelengths. A second coating 32 on incident light surface 36 intersects second plane P2 and is transmissive to wavelength $\lambda 2$ and reflects wavelength $\lambda 1$. A third coating 33 on incident light surface 36 intersects third plane P3 and is transmissive to wavelength $\lambda 3$ and reflects wavelengths $\lambda 1$ and $\lambda 2$. A fourth coating 35 reflects each of wavelengths $\lambda 1$, $\lambda 2$, and $\lambda 3$. This same pattern is followed where more than three laser arrays are used; where n laser arrays are used, (n+1) coatings are provided on surface 36. Coatings are applied in an ordered series, with any coating reflecting light that was transmitted through preceding coatings in the series. That is, with the exception of the last coating in the series, each successive coating on the incident light surface 36 (proceeding from top to bottom in the orientation shown in FIGS. 3A-3C) transmits the corresponding wavelength for laser light incident on that coating and reflects wavelengths for light obtained from previous coatings in the series. Specifically, the last coating in the series, coating 35 in the example embodiment of FIGS. 3A-3C, reflects all of the wavelengths for light transmitted through coatings 31, 32, and 33.

Angle $\theta$, shown in FIG. 3A, is the oblique angle between incident light surface 36 and any of planes P1, P2, or P3. Thus, the angle of incidence of emitted beams is oblique in the y-z plane, as shown in FIG. 3A. The angle of incidence is also oblique in the x-z plane, as described and shown subsequently.

Figure 3D:
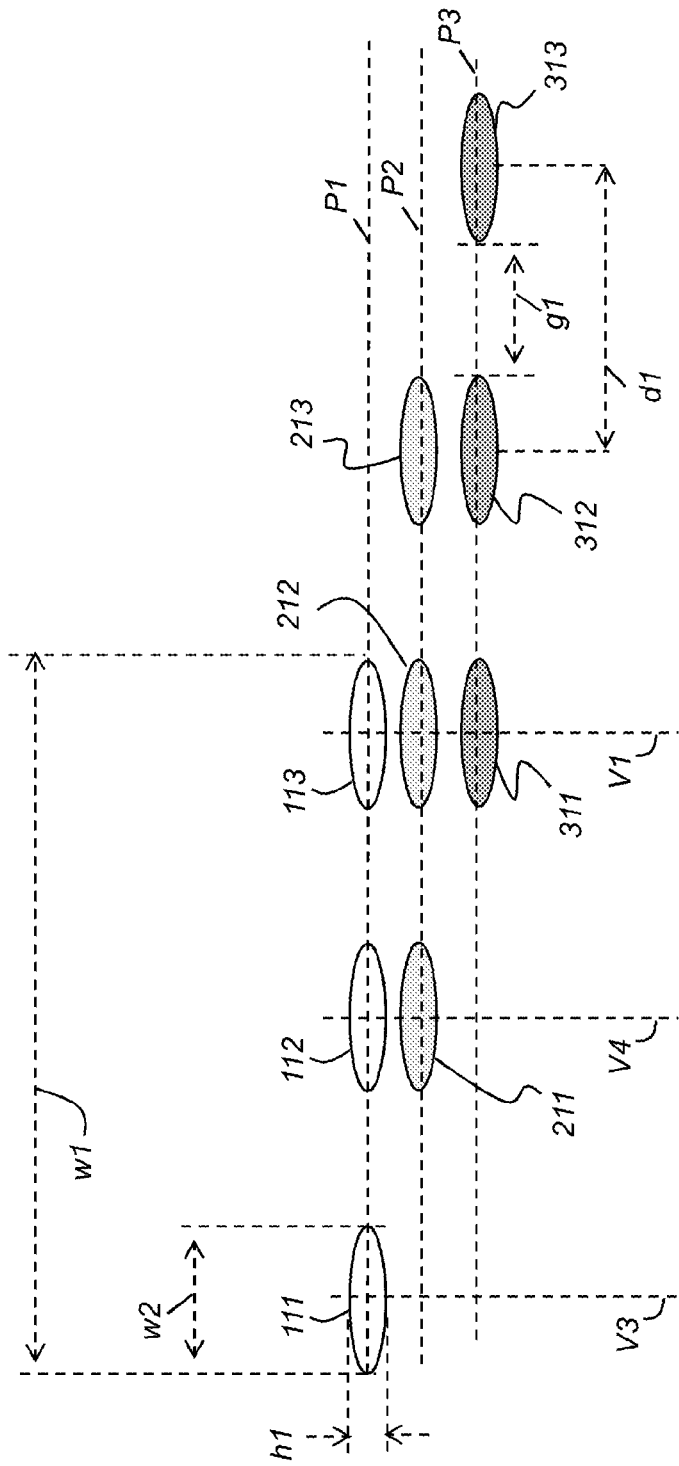
FIG. 3D is a plan view that shows input beams that are emitted from each of the laser arrays shown in FIGS. 3A through 3C.

FIG. 3D shows a plan view of the input beams that are emitted from each of laser arrays 100, 200, and 300, in FIGS. 3A, 3B, and 3C, respectively. Alternately stated, FIG. 3D shows the arrangement of beams as incident on the incident light surface 36 of beam combiner 30. It should be noted that FIG. 3D provides a schematic representation suited for labeling beams and showing various positional and dimensional relationships and is not drawn to scale. Planes P1, P2, and P3 extend orthogonally outward from the page in the FIG. 3D view. The laser arrays themselves are successively staggered in the width direction, that is, the first laser source of each successive array is incrementally shifted in position with respect to the corresponding first laser source of the preceding array. As shown in FIG. 3D, this incremental shift is with respect to an orthogonal line to plane P1 that extends through beam 111, shown as a line V3. Beams from each of the laser arrays are aligned with respect to this orthogonal direction, as shown by a line V1 extending through the centers of beams 113, 212, and 311. Line V1 can be considered to extend along the plane of the page and is orthogonal to each of planes P1, P2, and P3. Line V3, parallel to line V1, intersects the beam of one light source from the first laser array, that is, the first laser source of this array, and of no light source from the second or third laser arrays. For beams numbered in order from the corresponding edge of each of the first and second laser arrays, the center of the second beam 112 from the first laser array 100 is aligned with the center of the first beam 211 from the second laser array 200 along a line V2, parallel to lines V1 and V3 and thus also orthogonal to plane P1.

Figure 3E:
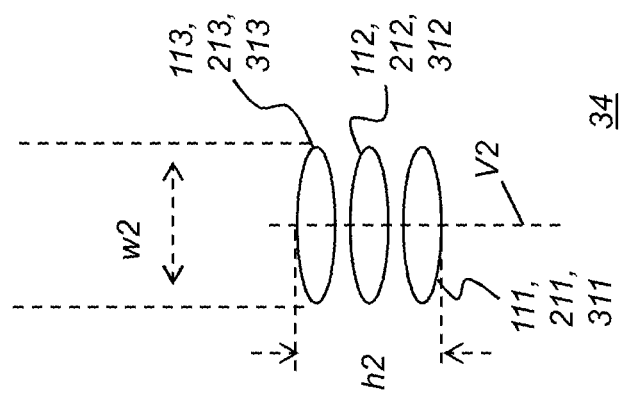
FIG. 3E is a plan view that shows the stacking of beams to form the output beam.

FIG. 3E, a plan view taken looking back along output axis A1, shows how the staggered beams are re-arranged by beam combiner 30 to form output beam 34. A single line V2, parallel to lines V1, V3, and V4 with the orientation shown in FIG. 3D, can now be extended through the center of each of the beams as indicated in the aligned, stacked arrangement of beams at the output.

As can be seen from FIGS. 3D and 3E, the width:height aspect ratio w1:h1 of the emitted laser beams that are input from any of the laser arrays, such as for the three laser sources of laser array 100, is more than twice, and is typically much higher than twice the width:height aspect ratio w2:h2 of output beam 34.

In the example shown in FIG. 3D, the laser sources of laser array 100 emit side-by-side beams 111, 112, and 113 with a total width w1 and height h1 for light emitted from this array. For example, a typical high power semiconductor diode laser bar consists of an array of three individual diode lasers with the total emitting dimension of 1100 μm×1 μm (w1×h1); this can be represented as a width:height aspect ratio of 1100:1. For such a diode laser array, each individual laser beam has a width w2 in the 100 μm range and a height h1 in the 1 μm range, for a width:height ratio of the beam of 100:1. A gap g1 between laser beams can be in the 400 μm range, so that distance dimension d1 between beam centers or axes is roughly about 500 μm.

In the example shown in FIG. 3E, beams 111, 112, and 113 can be stacked to form output beam 34 with dimensions in the range of 100 μm×50 μm (w2×h2); this gives a width:height aspect ratio of 2:1 for the output beam 34. Both the beam aspect ratio, computed by measuring a width w2 of a single beam and a height h2 of three stacked beams, and the spatial brightness are significantly improved for output beam 34. In addition, laser beams from two other laser arrays 200 and 300 are overlaid on top of beam 100, resulting in even higher power and brightness and maintaining the same beam width:height aspect ratio. Those practiced in the optical design art can readily recognize the value of obtaining a width:height aspect ratio of output beam 34 that is much less than the 100:1 ratio of the beam and that is even less than 2:1 and approaches unity. This arrangement allows output beam 34 to be more readily used in an optical system that employs symmetrical optics. By comparison, the arrangement of laser beams for any of the laser arrays shown in FIG. 3D, having a high width:height aspect ratio (such as 1100:1) and large emitting dimension, would present significant difficulties for handling by an optical system in many applications.

As shown in FIGS. 3A-3D, the emitted laser beams are arranged side-by-side as they are incident on the corresponding filter coatings 31, 32, or 33, respectively. Beam combiner 30 forms a combined output beam 34 on an output axis A1 by re-arranging the beams as follows:
  (i) stacking the beams in a direction orthogonal to the respective planes P1, P2, and P3, so that a single line V2 in this orthogonal direction can extend through the center of each laser beam or, alternately stated, through the axis of each laser beam, as shown in FIG. 3E; and
  (ii) overlaying the stacked beams for the input wavelengths λ1, λ2, and λ3 onto the same output path.

Figure 4B:
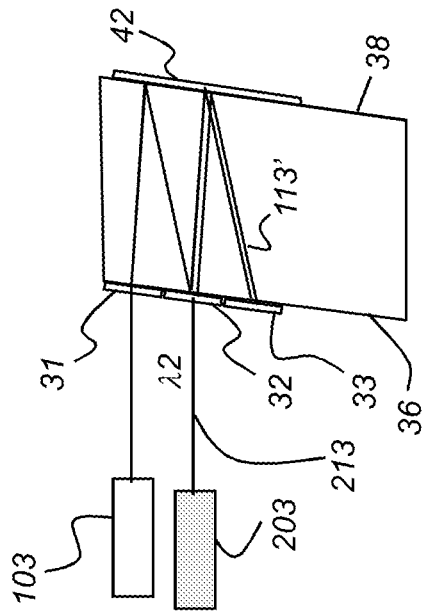
FIGS. 4A-4C are side view schematic diagrams that show the operation of a beam combiner according to description.

Within beam combiner 30, the light of each incident wavelength undergoes an ordered sequence of reflections from various surfaces in order to provide the stacked and overlaid output beam 34 in FIG. 3E, generated by the example progression shown in FIGS. 3A-3C. Following the example of FIGS. 3A-3C for combiner apparatus 90 with three laser arrays 100, 200, and 300, each with three laser sources, FIGS. 4A, 4B, 4C, and 4D show the operation of beam combiner 30 from a side view. FIGS. 5A, 5B, and 5C show the corresponding operation of beam combiner 30 from a top view. As with the set of FIGS. 3A-3C, it should be noted that, while the description may follow a single path as light moves between surfaces and coatings for light of a single wavelength, what is shown in sequence is actually happening simultaneously, with all of the laser sources providing light that is combined as described. It should also be noted that one or more individual laser sources could be selectively disabled if less power is desirable or if particular wavelengths are not wanted in an application.

Emission axes for beams within a laser diode array, for example, beams 111, 112, and 113 in laser array 100 of FIG. 3A, lie within the same plane (P1 for laser sources in laser array 100) and are equidistant from each other, with a distance d1 between the center of each adjacent beam. As was described with reference to FIGS. 3A-3C, the laser arrays are staggered from each other, in the direction orthogonal to the beams; this separation is by distance d1. Thus, from a top view, beam 113 from laser source 103 aligns with beam 212 from laser source 202 and with beam 311 from laser source 301.

Figure 3F:
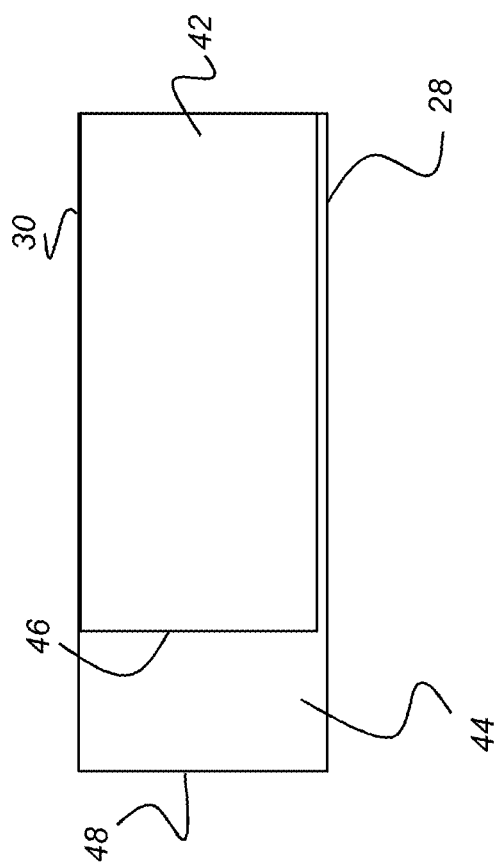
FIG. 3F is a plan view that shows a rear view of the beam combiner according to one embodiment.

As shown in the rear view of FIG. 3F, output area 44 lies between an edge 46 of rear reflective coating 42 and an edge 48 of transparent body 28. Edges 46 and 48 are parallel in the embodiment shown in FIGS. 3A and 3F and extend in a direction that is substantially orthogonal to the first plane P1.

How the different wavelengths of light are overlaid to provide wavelength beam combining is more clearly shown from a side view. For the examples of FIGS. 4A-4C, laser sources 103, 203, and 303 are shown. As noted previously, incident light surface 36 is at an oblique angle θ with respect to first plane P1.

Figure 4A:
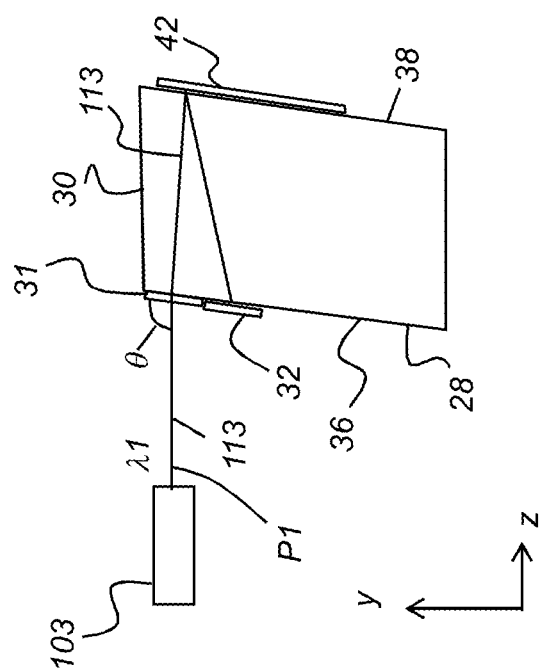
Figure 5A:
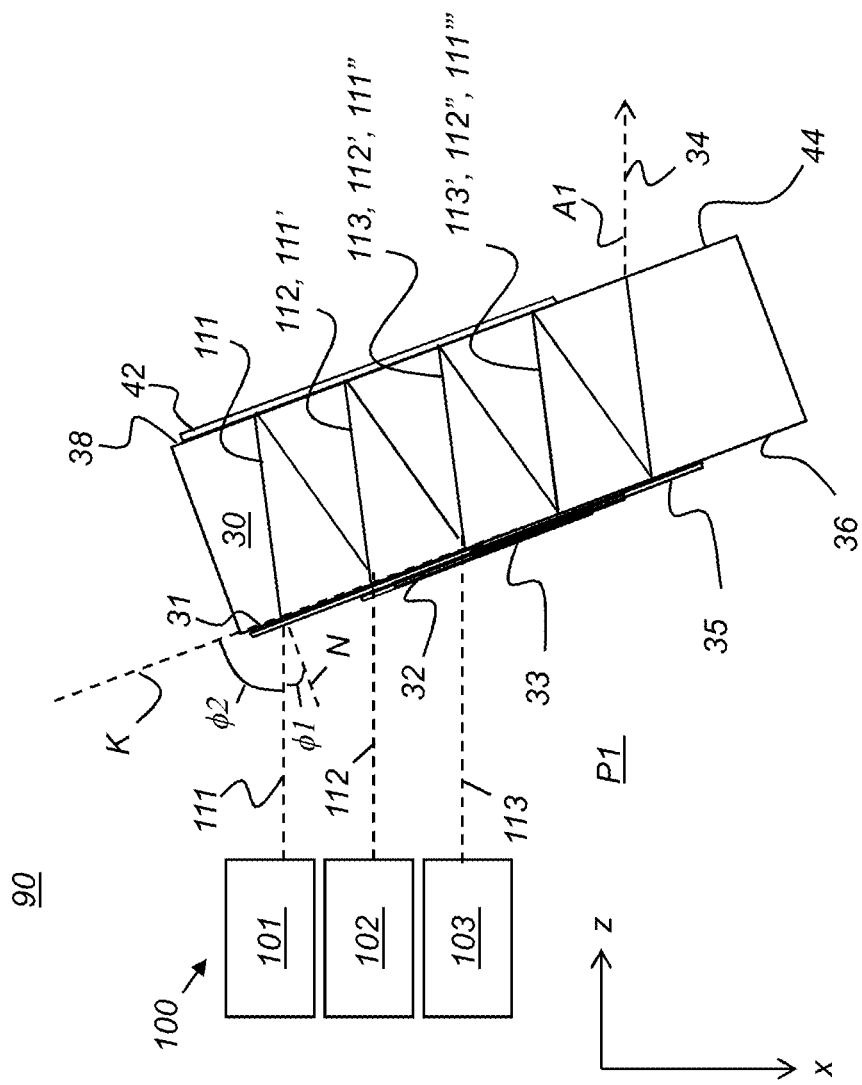
FIGS. 5A-5C are top view schematic diagrams that show the operation of a beam combiner according to the description.
Figure 5B:
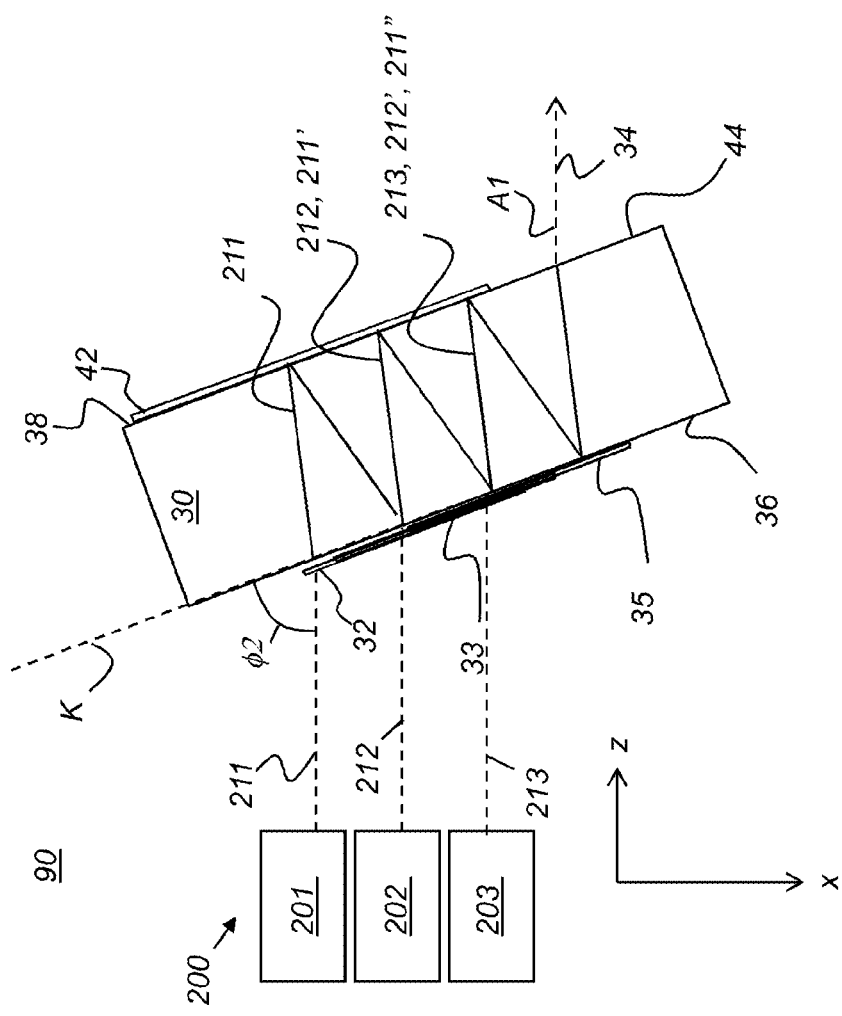
Figure 5C:
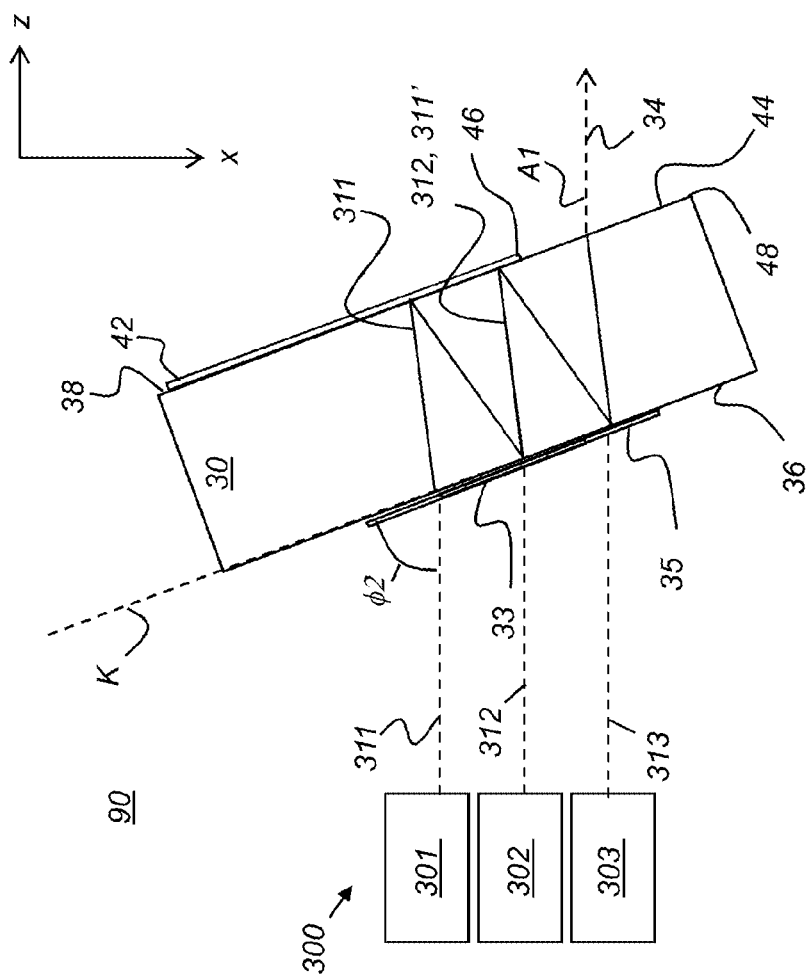

Beginning with the side view of FIG. 4A, beam 113 from laser source 103 is incident on coating 31 and transmitted through the transparent body 28 of beam combiner 30, typically with slight refraction as shown. This wavelength λ1 light is reflected from a rear reflective surface 42 and is thus directed back toward incident light surface 36, but now incident on coating 32.

FIG. 4B shows how beam combiner 30 continues to direct the reflected λ1 light from source 103, labeled as a beam 113' following this reflection, along the path begun in FIG. 4A and how the wavelength λ2 light from laser source 203 is routed. Beam 213 from laser source 203 is incident on coating 32 and transmitted through the transparent body of beam combiner 30 along with the λ1 light of reflected beam 113' as shown. This wavelength λ1 and λ2 light is reflected from rear reflective surface 42 and is thus directed back toward incident light surface 36, but now incident on coating 33.

Figure 4C:
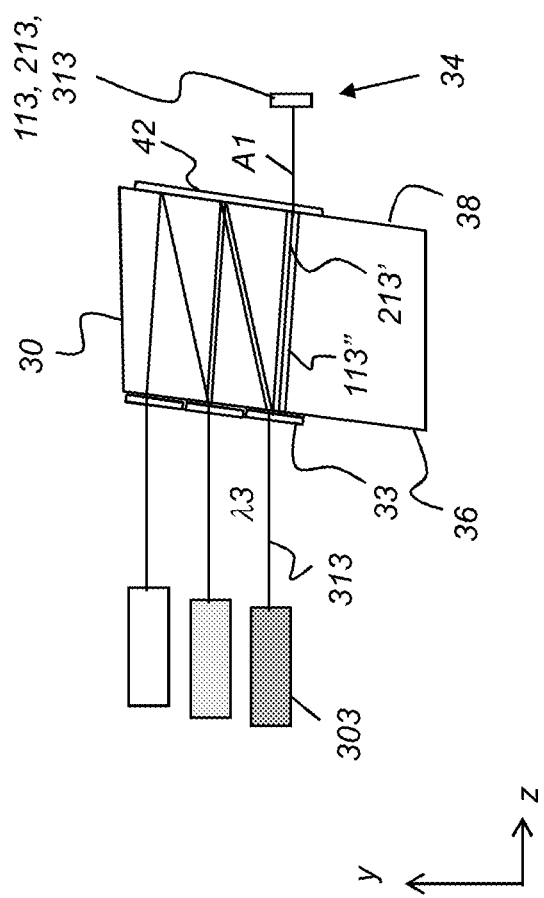

FIG. 4C shows how beam combiner 30 continues to direct the λ1 and λ2 light along the path begun in FIG. 4A and continued in FIG. 4B and how the wavelength λ3 light from laser source 303 is routed along the same path. Beam 313 from laser source 303 is incident on coating 33 and transmitted through the transparent body of beam combiner 30, again with slight refraction as shown. The wavelength λ3 light is now on the same path as the reflected wavelength λ1 and λ2 light, shown along beams 113" and 213', and exits onto output axis A1 at an output area 44. In this way, beams 113, 213, and 313 are overlaid as part of output beam 34.

Figure 4D:
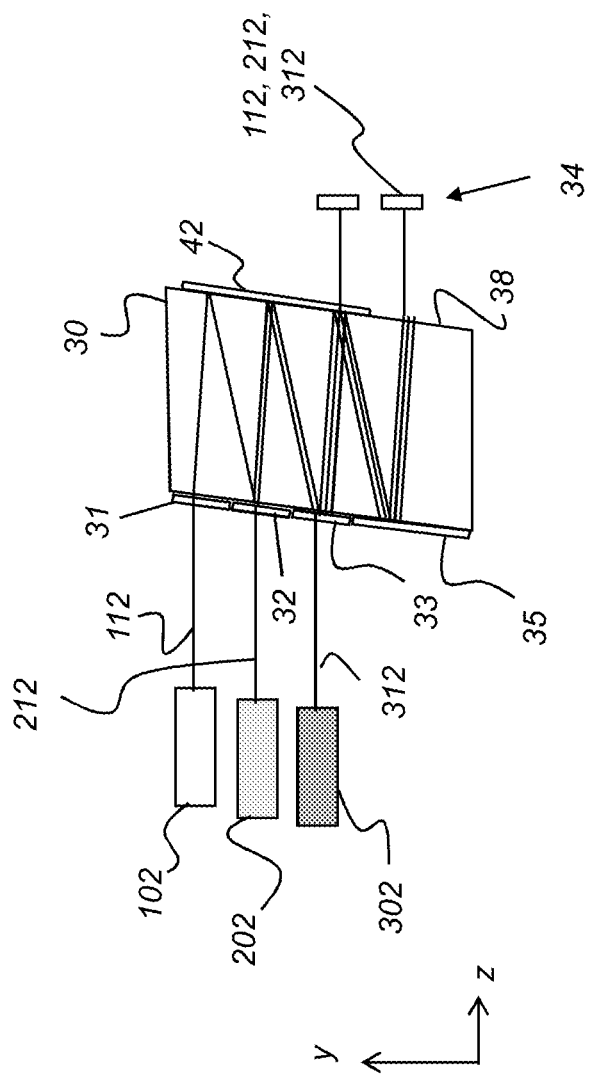
FIG. 4D is a side view schematic diagram that shows the operation of a beam combiner for a different set of laser sources.

FIG. 4D shows the paths of light beams for laser sources 102, 202, and 302 of FIGS. 3A-3C. By comparison with the light from adjacent laser sources 103, 203, and 303 (FIG. 4C), in order to shift the light beams and stack them along the y axis direction, two more reflections are required for laser sources 102, 202, and 302. There is an additional reflection from rear reflective coating 42 and from coating 35 on the incident light surface. Following a similar pattern, the paths for light beams from laser sources 101, 201, and 301 of FIGS. 3A-3C would encounter another two added reflections in addition to those shown for laser sources 102, 202, and 302 in FIG. 4D.

How the beams of light of each laser array are stacked in a direction orthogonal to planes P1, P2, and P3 to provide spatial rearrangement and an output beam having a different beam aspect ratio from the input incident beams is more clearly shown from a top view. By way of example, FIGS. 5A, 5B, and 5C trace the individual paths of beams from laser arrays 100, 200, and 300, respectively. FIG. 5A shows the path of beams 111, 112, and 113. Beams 111, 112, and 113 all lie within plane P1, as described previously with reference to FIGS. 3A and 3D. A line K shown in the top view of FIG. 5A lies in plane P1 and is the extended line of intersection of incident light surface 36 of beam combiner 30 with plane P1. Line K is oblique to beam 111, as shown by an angle φ2, and is similarly oblique to the other emitted beams 112 and 113 of wavelength λ1 from laser array 100.

Continuing with FIG. 5A, at incidence, beams 111, 112, and 113 are directed through coating 31. Beam 111 is then reflected from rear reflective surface 42 so that it is next incident on, and reflected from, coating 32 as beam 111'. This reflected beam 111' is aligned with beam 112 from the top view perspective shown. Beams 111' and 112 are reflected from rear reflective surface 42 so that these beams are next incident on, and reflected from, coating 33 and 32 as beams 111" and 112', respectively. Reflected beams 111" and 112' are aligned with beam 113 from the top view perspective shown. Beams 111", 112', and 113 are reflected from rear reflective surface 42 so that these beams are next incident on, and reflected from, coating 35, 33, and 32 as beams 111'", 112", and 113', respectively. Following a subsequent reflection cycle, with one reflection each from rear reflective coating 42 and coating 35 and 33, the combined beam exits output area 44 of beam combiner 30 as part of output beam 34.

In a similar pattern and shifted so that beam 211 of laser array 200 aligns with beam 112 from laser array 100, FIG. 5B shows the path of beams 211, 212, and 213. Line K is again oblique to beam 211, as shown by angle φ2, and is similarly oblique to the other emitted beams 212 and 213 of wavelength λ2 from laser array 200. At incidence, beams 211, 212, and 213 are directed through coating 32. Beam 211 is then reflected from rear reflective surface 42 so that it is next incident on, and reflected from, coating 33 as beam 211'. This reflected beam 211' is aligned with beam 212 from the top view perspective shown. Beams 211' and 212 are reflected from rear reflective surface 42 so that these beams are next incident on, and reflected from, coating 35 or 33 as beams 211" and 212'. Reflected beams 211" and 212' are aligned with beam 213 from the top view perspective shown. Beams 211", 212', and 213 are reflected from rear reflective surface 42 so that these beams are next incident on, and reflected from, coating 35 and 33. The combined beam exits output area 44 of beam combiner 30 as part of output beam 34.

In a similar pattern and shifted so that beam 311 of laser array 300 aligns, from a top view perspective, with beam 212 from laser array 200 and with beam 113 from laser array 100, FIG. 5C shows the path of beams 311, 312, and 313. Line K is again oblique to beam 311, as shown by angle φ2, and is similarly oblique to the other emitted beams 312 and 313 of wavelength λ3 from laser array 300. At incidence, beams 311, 312, and 313 are directed through coating 33. Beam 311 is then reflected from rear reflective surface 42 so that it is next incident on, and reflected from, coating 35 as beam 311'. This reflected beam 311' is aligned with beam 312 from the top view perspective shown. Beams 311' and 312 are reflected from rear reflective surface 42 so that these beams are next incident on, and reflected from, coating 35 and align with beam 313. The combined beam exits output area 44 of beam combiner 30 as part of output beam 34.

As shown in the top view of FIG. 5A, incident light surface 36 of beam combiner 30 is at an oblique angle φ1 to the incident beams from laser arrays, in the x-z plane of the top view, with N as a normal to incident surface 36.

While the example described in the present disclosure has shown how to combine three light sources from each of three laser arrays, it can be appreciated that the pattern of components and light paths shown in FIGS. 3A through 5C can be applied for combining laser light from two or more laser arrays, wherein each laser array has two or more laser sources. For example, four laser arrays could be used, each having, two, three, four, or more laser sources, with corresponding coatings on beam combiner 30.

Stacking of laser light sources can be considered as a two-dimensional array, as follows: For a non-zero integer m of laser arrays m=[1, 2, ... M], there are m rows of laser light sources. Where each laser array has a non-zero integer n of laser light sources n=[1, 2, ... N], there are n columns in each row, so that there are a total of product (m×n) laser light sources. In a row-wise direction (along the x-axis in FIG. 3A), there are laser sources at each of the positions (m, n), which can be considered as (row, column) positions or as (array, source) coordinates. The beams that are combined to spatially overlap beam (1, 1) are beams [(2, 1), (3, 1), ... (M, 1)]. The beams that are combined to spatially overlap beam (1, 2) are beams [(2, 2), (3, 2), ... (M, 2)]. So that in general, beams that are combined with beam (1, n) are all beams (A, n), wherein A ranges from [2 ... M].

Beams that are aligned at the incident light surface 36 with respect to beam (1, n) along the y axis are beams in successive rows, with beams shifted one increment (that is, shifted distance d1 in FIG. 3A) for each row. Thus, using the (row, column) notation described herein, beams that align at the input with beam (1, 3) are beams (2, 2) and (3, 1). With reference to FIGS. 3A-3C, beam (1,3) corresponds to beam 113; beam (2,2) corresponds to beam 212; beam (3,1) corresponds to beam 311.

The laser light that is provided can be used for a number of purposes. The combined light beam can be directed into an optical fiber or other light guide or directed to another optical system.

Beam combiner 30 provides a number of features and advantages over conventional solutions for combining multiple laser sources to form a single composite light beam. These advantages include:
 (i) Use of a low-cost transparent plate, such as a glass or quartz plate with thin-film coatings. The use of thin-film coatings allows a very sharp edge to be presented to incoming light beams, reducing scatter and other effects.

(ii) Adjustable aspect ratio, obtained by slight angular adjustment of angles $\phi2$ or $\theta$, or selectively enabling or disabling different sources within each array.
(iii) Scalable, with a variable number of laser arrays at different wavelengths, as well as laser diode sources within each array.
(iv) Straightforward fabrication and simplified alignment.
(v) Reduced etendue with respect to one axis, advantageous for directing the combined light to other optical components.
(vi) Compact, with multiple optical surfaces on a single optical elements.

The transparent body of beam combiner 30 is typically a glass plate or glass block, selected for suitability with the intended laser wavelengths. Other transparent materials can be used, including crystalline materials and plastics, for example. Conventional mounting techniques can be used to position beam combiner 30 at a suitable oblique in-plane angle $\phi2$ with respect to the emitted laser beams, as was described earlier with reference to FIGS. 5A-5C as well as angle $\theta$ as shown in FIGS. 3A and 4A.

Angles $\phi2$ and $\theta$ and the thickness of the beam combiner 30 are determined by the index of refraction n of the selected glass or other transparent body 28 of material used for beam combiner 30, and the dimensions of the input beam and output beam.

Coatings for filtering the incident light and reflecting light according to the pattern described for FIGS. 3A through 5C are thin-film coatings. With respect to the coatings shown in these figures, any of coatings 31, 32, 33, 35, and 42 can be provided as multilayer thin film coatings, formed directly on the appropriate surfaces of the body 28 of transparent material. Alternate types of coatings could be used, including reflective metal coatings for rear reflective coating 42 and coating 35, for example. Coatings 31, 32, 33, and 35 can extend across the full length of incident light surface 36 or can be staggered to match the staggered arrangement of laser arrays, as was described previously with respect to FIGS. 3C and 3D. It should also be noted that rear reflective coating 42 can extend from the bottom edge to the top edge of rear surface 38 in the view shown in FIG. 4D, for example, leaving a suitable transparent window along surface 38 for the combined light output of output beam 34.

Beam combiner 30 can be used with laser diodes having on-chip gratings, as described previously with reference to FIG. 2B. In addition, beam combiner 30 can also be used with other types of laser elements that generate light of different wavelengths.

Exemplary embodiments described herein show a beam combiner that forms a combined beam from light of three different wavelengths. As has been noted previously, fewer or more than three wavelengths can be combined, with corresponding changes to dimensions and number of coatings and their characteristics, for example.

Various embodiments have been described in detail with particular reference to certain preferred embodiments thereof, but it will be understood that variations and modifications can be effected within the scope of the appended claims.

Thus, what is provided is an apparatus and method for combining light from laser arrays, wherein the light is of different wavelengths.

The invention claimed is:

1. An apparatus for combining laser light from multiple laser sources, the apparatus comprising:
    a first laser array that includes a first plurality of laser sources, wherein each laser source in the first laser array is energizable to emit a beam of a first wavelength $\lambda1$ and wherein emitted beams for the laser sources in the first laser array are in parallel and lie in a first plane P1;
    a second laser array that includes a second plurality of laser sources, wherein each laser source in the second laser array is energizable to emit a beam of a second wavelength $\lambda2$ and wherein emitted beams for the laser sources in the second laser array lie in a second plane P2 and are in parallel with emitted beams for the laser sources in the first laser array, and
    a beam combiner that is formed on a transparent body, wherein the beam combiner has a rear surface and an incident light surface that is disposed in the path of the emitted beams from the first and second laser arrays and wherein the incident light surface is at an oblique angle with respect to the first plane P1 and wherein a line of intersection of the incident light surface with the first plane P1 is oblique to the emitted beams of the first wavelength $\lambda1$, and wherein the beam combiner has:
        (i) a first coating on the incident light surface that intersects the first plane P1, wherein the first coating is transmissive to the first wavelength $\lambda1$;
        (ii) a rear reflective coating that is reflective to the first and second wavelengths $\lambda1$ and $\lambda2$, formed on a portion of the rear surface;
        (iii) a second coating on the incident light surface that intersects the second plane P2 and that is coplanar with the first coating, wherein the second coating is transmissive to the second wavelength $\lambda2$ and reflective to the first wavelength $\lambda1$;
        (iv) a third coating on the incident light surface that is reflective to the first and second wavelengths $\lambda1$ and $\lambda2$.

2. The apparatus of claim 1 further comprising:
    a third laser array that includes a third plurality of laser sources, wherein each laser source in the third laser array is energizable to emit a beam of a third wavelength $\lambda3$ and wherein emitted beams for the laser sources in the third laser array lie in a third plane P3 and are in parallel with emitted beams for the laser sources in the first laser array,
    wherein the third coating of the beam combiner further intersects the third plane P3 and is transmissive to the third wavelength $\lambda3$,
    wherein the rear coating of the beam combiner is further reflective to the third wavelength $\lambda3$,
    and wherein the beam combiner further comprises a fourth coating on the incident light surface wherein the fourth coating is reflective to the first, second, and third wavelengths $\lambda1$, $\lambda2$, and $\lambda3$, respectively.

3. The apparatus of claim 1 further comprising conditioning optics for each of the first plurality of laser sources, wherein the conditioning optics modify the beam shape for each emitted beam of the first wavelength $\lambda1$.

4. The apparatus of claim 1 wherein at least the first plurality of laser sources in the first laser array are laser diodes.

5. The apparatus of claim 4 wherein the laser diodes in the laser array comprise monolithic integrated gratings.

6. The apparatus of claim 1 wherein the first coating is a thin film coating.

7. The apparatus of claim 1 wherein the transparent body is of a material taken from the group consisting of a glass, a plastic, and a crystalline material.

8. The apparatus of claim 1 wherein, for beams numbered in order along each of the first and second laser arrays, the center of a second beam from the first laser array is aligned, along a line that is orthogonal to the first plane P1, with the center of a first beam from the second laser array.

9. The apparatus of claim 1 wherein the beam combiner has an output area on a portion of the rear surface and wherein the output area lies between a first edge of the rear reflective coating and a second edge of the transparent body and wherein the first and second edges are substantially in parallel and extend in a direction that is substantially orthogonal to the first plane P1.

10. A method for providing combined laser light from multiple laser sources, the method comprising:
   energizing a first laser array that includes a first plurality of laser sources, wherein each laser source in the first laser array is energizable to emit a beam of a first wavelength λ1 and wherein emitted beams for the laser sources in the first laser array are in parallel and lie in a first plane P1;
   energizing a second laser array that includes a second plurality of laser sources, wherein each laser source in the second laser array is energizable to emit a beam of a second wavelength λ2 and wherein emitted beams for the laser sources in the second laser array lie in a second plane P2 and are in parallel with emitted beams for the laser sources in the first laser array, and
   forming an output beam by disposing a beam combiner that is formed on a transparent body in the path of the light emitted from the first and second laser arrays, wherein the beam combiner has a rear surface and an incident light surface that is disposed in the path of the emitted beams from the first and second laser arrays and wherein the incident light surface is at an oblique angle with respect to first plane P1 and wherein a line of intersection of the incident light surface with first plane P1 is oblique to the emitted beams of wavelength λ1, and wherein the beam combiner has:
      (i) a first coating on the incident light surface that intersects the first plane P1, wherein the first coating is transmissive to the first wavelength λ1;
      (ii) a rear reflective coating that is reflective to the first and second wavelengths λ1 and λ2, formed on a portion of the rear surface;
      (iii) a second coating on the incident light surface that intersects the second plane P2 and that is coplanar with the first coating, wherein the second coating is transmissive to the second wavelength λ2 and reflective to the first wavelength λ1;
      (iv) a third coating on the incident light surface that is reflective to the first and second wavelengths λ1 and λ2.

11. The method of claim 10 wherein a width:height ratio of the light emitted from the first laser array is more than twice the width:height ratio of the output beam formed by the beam combiner.

12. The method of claim 10 wherein at least the first plurality of laser sources in the first laser array are laser diodes.

13. The method of claim 12 wherein the laser diodes in the laser array comprise monolithic integrated gratings.

14. The method of claim 10 wherein the first coating is a multilayer thin film coating.

15. The method of claim 10 wherein the transparent body is of a material taken from the group consisting of a glass, a plastic, and a crystalline material.

16. An apparatus for combining laser light from multiple laser sources, the apparatus comprising:
   a first laser array that includes a first plurality of laser diode sources, wherein each laser diode source in the first laser array is energizable to emit a beam of a first wavelength λ1 and wherein emitted beams for the laser diode sources in the first laser array are in parallel and lie in a first plane P1;
   a second laser array that includes a second plurality of laser diode sources, wherein each laser diode source in the second laser array is energizable to emit a beam of a second wavelength λ2 and wherein emitted beams for the laser diode sources in the second laser array lie in a second plane P2 and are in parallel with emitted beams for the laser diode sources in the first laser array, and
   a beam combiner that is formed on a transparent body, wherein the beam combiner has a rear surface and an incident light surface that is substantially in parallel with the rear surface and that is disposed in the path of the emitted beams from the first and second laser arrays and wherein the incident light surface is at an oblique angle with respect to the first plane P1 and wherein a line of intersection of the incident light surface with the first plane P1 is oblique to the emitted beams of the first wavelength λ1, and wherein the beam combiner has:
      (i) a first multilayer thin film coating on the incident light surface that intersects the first plane P1, wherein the first coating is transmissive to the first wavelength λ1;
      (ii) a rear reflective coating that is reflective to the first and second wavelengths λ1 and λ2 and that is formed on a portion of the rear surface;
      (iii) a second multilayer thin film coating on the incident light surface that intersects the second plane P2 and that is coplanar with the first coating, wherein the second coating is transmissive to second wavelength λ2 and reflective to first wavelength λ1;
      (iv) a third coating on the incident light surface that is reflective to the first and second wavelengths λ1 and λ2;
   wherein the beam combiner has an output area on a portion of the rear surface and wherein the output area lies between a first edge of the rear reflective coating and a second edge of the transparent body and wherein the first and second edges are substantially in parallel and extend in a direction that is substantially orthogonal to the first plane P1.

* * * * *